United States Patent
Agarwal et al.

(10) Patent No.: US 10,469,986 B1
(45) Date of Patent: Nov. 5, 2019

(54) CRITERIA-BASED LOCATION TRACKING AND NOTIFICATION SYSTEM

(71) Applicant: PAG Financial International LLC, Guaynabo, PR (US)

(72) Inventors: Pavan Agarwal, Cerritos, CA (US); Gabriel Albors Sanchez, Cerritos, CA (US); Jonathan Ortiz Rivera, Cerritos, CA (US)

(73) Assignee: PAG Financial International LLC, Guaynabo, PR (US)

( * ) Notice: Subject to any disclaimer, the term of this patent is extended or adjusted under 35 U.S.C. 154(b) by 0 days.

(21) Appl. No.: 16/112,214

(22) Filed: Aug. 24, 2018

(51) Int. Cl.
*H04W 4/029* (2018.01)
*H04W 4/021* (2018.01)

(52) U.S. Cl.
CPC ............ *H04W 4/021* (2013.01); *H04W 4/029* (2018.02)

(58) Field of Classification Search
CPC ..... G08B 21/22; G08B 15/004; H04W 4/021; H04W 4/90
USPC ............... 455/414.1, 414.3, 456.1, 414.2; 340/539.1, 573.4
See application file for complete search history.

(56) References Cited

U.S. PATENT DOCUMENTS

| 6,054,928 A * | 4/2000 | Lemelson ......... G08B 21/0233 340/539.1 |
| 2014/0368601 A1* | 12/2014 | deCharms ............ H04W 4/021 348/14.02 |

* cited by examiner

*Primary Examiner* — Sam Bhattacharya
(74) *Attorney, Agent, or Firm* — Sheppard Mullin Richter & Hampton LLP (57) ABSTRACT

Systems and methods are provided for providing criteria-based location notifications to parents based on a geolocation of a child. Geolocation information may be transmitted from a child's mobile device. Geolocation information may include a geolocation of a child user and may be processed in accordance with user-selected parameters specifying a set of undesirable geolocations provided by the parent user. The determination that the child user's geolocation satisfies child user's parameters may trigger a notification transmitted to the parent user. Determination of a likelihood of incident occurrence for a child user at a geolocation may be made in accordance with a threshold parameter provided by the parent user. The determination may be performed by analyzing geolocation information, user information provided by the parent user, and additional information obtained by the system. An incident indicator generated during the determination may quantify a likelihood of an occurrence of a negative event at the geolocation.

20 Claims, 8 Drawing Sheets

CRITERIA-BASED LOCATION TRACKING AND NOTIFICATION SYSTEM

TECHNICAL FIELD

The present disclosure is generally related to geolocation tracking used to generate criteria-based notification. More particularly, the present disclosure is directed to systems and methods for determining a likelihood of incident occurrence at a geolocation and generating a notification if the likelihood of incident occurrence satisfies a user-specified location criteria.

BACKGROUND

With almost 240 million mobile phone internet users currently, the United States is one of the largest mobile communication markets in the world. Over 270 million Americans are projected to use a smartphone by 2022. In fact, the United States is the third-most smartphone users worldwide, trailing only China and India. The demographic characteristics of smartphone users are changing. In 2015, 88 percent of teenagers, ages 13 to 17 have access to a cellphone, an increase from 37 percent in 2013. Finally, 91 percent of teenagers, ages 13 to 17, access the internet on cell phones, tablets and other mobile devices at least occasionally.

Accordingly, increasingly younger users enter the smartphone market each year. Some parents are still reluctant to provide smartphones to their children. Smartphones equipped with GPS give parents an ability to track their child's location at all times. Thus, location monitoring may incentivize parents to maintain a child's access to a smartphone.

Mobile carriers look for opportunities to increase both revenue and profits by providing new services. One of the needs families and individuals have is to be able to specify parameters related to location tracking. Anther need is for parents to have a system that determines the safety of a location by using on external data related to a child's current location. Thus, a customizable, criteria-based location tracking system that provides parents with a determination as to a relative safety of a geolocation visited by the child will positively affect mobile device usage growth.

SUMMARY

In accordance with one or more embodiments, various features and functionality can be provided to enable or otherwise facilitate criteria-based location alerts. Particularly, mobile devices with global positioning system (GPS) receivers may transmit geolocation information to a criteria-based location notification system. The system may use the geolocation information as well as data received from other sources to determine a likelihood of an event or incident having negative implications occurring.

In one embodiment, a parent user may specify locations, that if visited by a child user of a mobile computing device, will result in an alert or a notification to the parent user's mobile device. The system may obtain geolocation information transmitted by the child user's mobile computing device. The geolocation information may include a geolocation of the child user and, if the child user is traveling, a direction of travel and/or speed with which the child user is traveling. Further still, in some implementations, the system may obtain the geolocation information by requesting the child user to provide it. For example, the system may request the child user to provide a street address or enter other location identifying attributes, such as prominent landmarks.

In one embodiment, the parent user may provide location characteristics rather than specifying a set of actual geolocations. For example, the parent may provide descriptions associated with geolocations using attributes that would contribute a negative incident occurrence (e.g., a high number of registered sex number, a high crime rate, inclusion of attractive nuisances, such as lakes, cliffs, and so on). The system may use these attributes to determine whether the child's geolocation includes at least one or more of the attributes specified by the parent user. Determining that the child's geolocation includes at least one or more attributes provided by the parent triggers the system to generate a notification transmitted to the mobile computing device of the parent.

Additionally, in some embodiments, system may be configured to perform a likelihood of incident occurrence determination for the geolocation of the child user based on the geolocation information in accordance with a threshold parameter provided by the parent. To perform the likelihood of incident occurrence determination, the system may obtain additional information from one or more external resources. For example, additional information may include crime statistics, traffic information, weather conditions, news reports, and so on. Accordingly, if the child enters a geolocation associated with a high crime rate, the system may determine the likelihood of incident occurrence at the geolocation by generating an incident indicator reflecting a certain likelihood of incident occurrence at that geolocation. The incident indicator may be compared against the threshold provided by the parent. A determination resulting that the incident indicator satisfies the threshold may trigger a notification transmitted from the system the parent. The notification may inform the parent that the child user is located at a geolocation associated with a likelihood of incident occurrence above the threshold provided by the parent.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Embodiments disclosed herein relate to systems and methods for providing notifications to users based on geolocations of other users. Typically, parents are able to track the whereabouts of their children by receiving positioning information transmitted by a child's mobile computing device. One hinderance to this location tracking is the amount of effort it requires for a parent to monitor child's movement.

Criteria-based location notification reduces the time required for parents to monitor their child's location. Instead, the parents may receive alerts when their child enters a location they have identified as undesirable. However, parents may not be familiar with all locations or may be unaware of potential negative impacts associated with all locations when providing specific locations for criteria-based location monitoring. Typically, parents would have to research individual locations and determine their relative safety.

Some embodiments disclosed herein enable parents to receive criteria-based location notifications by entering attributes of geolocations associated with having a negative impact on their child, rather than a set of geolocations. Additional embodiments enable parents to receive determinations of relative safety associated with a location made by the system in accordance with a threshold and other information the parent may specify.

Figure 1:
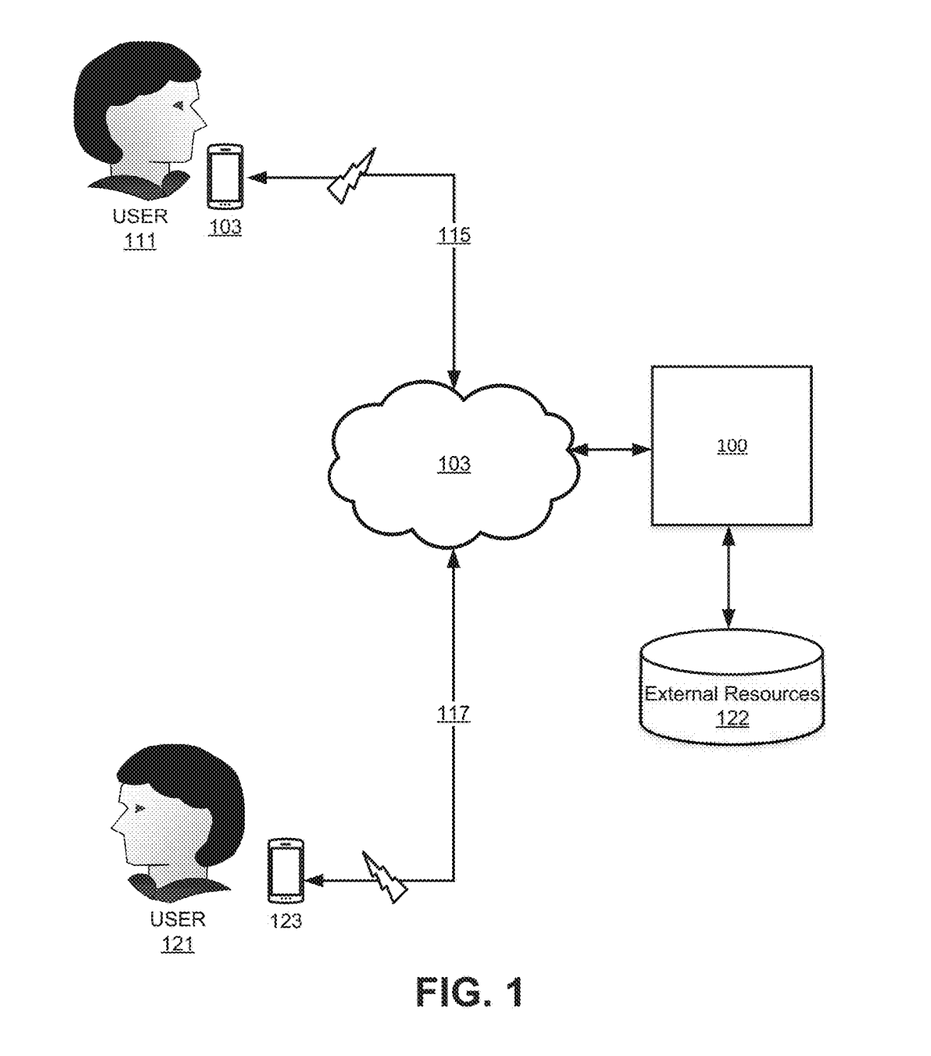
FIG. 1 illustrates a system configured to provide criteria-based location notifications, in accordance with one or more implementations.

System 100 may be configured track movements of users using a mobile computing device, that is equipped with a GPS, such that the physical movements of the users may be impacted by a type of geolocation of the users. Geolocations of the users may be tracked, for example via the GPS. Certain geolocations of the users may be associated with a high occurrence of incidents having a potentially negative impact on the users. These geolocations may be so identified by system 100 or by supervisors of the users, such as parents and/or other supervisors. Information related to the geolocations of the users being monitored may be provided to supervisors of the users. Providing this geolocation information may include sending notifications to the parents that their child has entered an undesirable geolocation over a network.

FIG. 1 depicts system 100 for providing criteria-based location notifications. System 100 may receive input data from various sources outside system 100. User 111 may have mobile computing device 103, which may be registered in advance with system 100. For example, user 111 may be a child or a minor that is being supervised by user 121, user's 111 parent, guardian, teacher, or other such supervisor. Mobile computing device 103 of user 1111 may be equipped with GPS location tracking and may transmit geolocation information via wireless link 115 and communications network 103 to system 100. System 100 may use the geolocation information to determine a geolocation of user 111. System 100 may use signal transmitted by mobile computing device 103 to determine the geolocation of user 111 based on one or more of signal strength, GPS, cell tower triangulation, Wi-Fi location, or other input. In some implementations, user movements of user 111 may be tracked using a geography-based transmitter on mobile computing device 103.

In some implementations, user 111 may be traveling in a motor vehicle or other means of transportation. Accordingly, system 100 may obtain geolocation information comprising of a direction of travel and/or speed with which user 111 is traveling. Further still, in some implementations, system 100 may obtain the geolocation information directly from user 111. For example, system 100 may request user 111 to provide a street address or enter other location identifying attributes, such as prominent landmarks.

The geolocation information corresponding to the geolocation of user 111 transmitted from mobile computing device 103 may be processed by system 100. The geolocation information may be processed by system 100 in accordance with location and other parameters provided by user 121. For example, user 121 may provide a set of geolocations that are considered dangerous or undesirable for user 111 to be in (e.g., a lake, a high traffic area, a construction site, and so on), as further illustrated in FIGS. 2A-2D. The geolocation information may be used by system 100 to determine, in accordance with the location parameters, whether the geolocation of user 111 satisfies the location parameters. For example, if user 111 enters an area at or near a pond, that has been previously identified by user 121 as dangerous, system 111 will determine that user's 111 geolocation satisfies the location parameter provided by user 121. The determination that user's 111 geolocation satisfies the location parameter provided by user 121, may trigger a notification transmitted from system 100 via wireless link 117 and communications network 103 to mobile computing device 123 of user 121. The notification transmitted to user 121 may include user's 111 geolocation, time, and other information.

In one embodiment, the location parameters provided by user 121 may include location characteristics rather than a set of actual geolocations. For example, user 121 may provide descriptions associated with geolocations using attributes that would contribute a negative incident occurrence (e.g., a high number of registered sex number, a high crime rate, inclusion of attractive nuisances, such as lakes, cliffs, and so on). System 100 may use these attributes when determining whether user's 111 geolocation includes at least one or more of the attributes specified by user 121. Determination that users' 111 geolocation includes at least one or more attributes provided by user 121 may trigger system 100 to generate a notification transmitted to mobile computing device 123 of user 121.

In some embodiments, system 100 may be configured to perform a likelihood of incident occurrence determination for the geolocation of user 111. The likelihood of incident occurrence determination at the geolocation of user 111 may be made based on the geolocation information in accordance with the location parameters. For example, if user 111 has entered an area at or near a large cliff, previously identified by user 121 as dangerous, system 111 may determine a likelihood of incident occurrence at the geolocation. In response to the determination, a notification may be transmitted from system 100 via wireless link 117 and communications network 103 to mobile computing device 123 of user 121. The notification may inform user 121 that user 111 is located at the geolocation identified by user 121 as undesirable and include a result of the likelihood of incident determination's associated with users' 111 geolocation.

Additionally, in some embodiments, system 100 may be configured to perform a likelihood of incident occurrence determination for the geolocation of user 111 based on the geolocation information in accordance with a threshold parameter provided by user 121. To perform the likelihood of incident occurrence determination, system 100 may obtain additional information from one or more external resources 122. For example, additional information may include crime statistics, traffic information, weather conditions, news reports, and so on. For example, if user 111 enters a geolocation associated with a high crime rate, system 100 may determine the likelihood of incident occurrence at the geolocation by generating an incident indicator reflecting a likelihood of incident occurrence at that geolocation. The incident indicator may be compared against the threshold parameter provided by user 121. A determination indicating that the incident indicator satisfies the threshold parameter may trigger a notification transmitted from system 100 via wireless link 117 and communications network 103 to mobile computing device 123 of user 121. The notification may inform user 121 that user 111 is located at the geolocation associated with the likelihood of incident occurrence above the threshold provided by user 121.

Figure 2A:
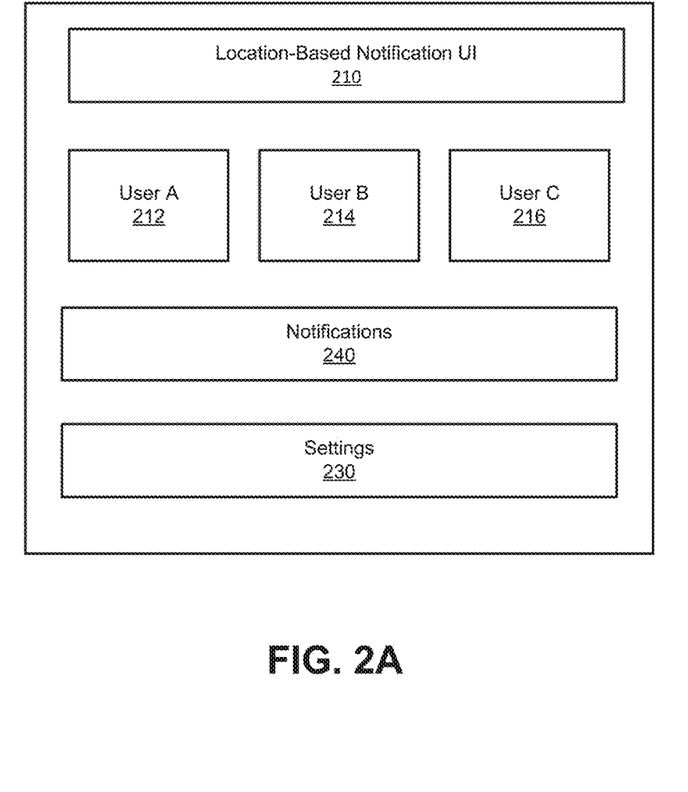
FIG. 2A illustrates an exemplary criteria-based location notification user interface configured for specifying criteria parameters, in accordance with one or more implementations.

FIG. 2A illustrates an example graphical user interface 210 of system 100 configured to provide criteria-based location notifications, as illustrated in FIG. 1. In some implementations, system 100 may be configured to communicate with one or more mobile computing devices according to a client/server architecture. A user, identified as user 121 in FIG. 1, which may be a parent, for example, may access system 100 via criteria-based location notification user interface 210 on a mobile computing device, identified as mobile computing device 123 in FIG. 1.

The user may configure the system (i.e., system 100 illustrated in FIG. 1) by entering information related to individual users whose geolocations that user wants to monitor or control. For example, a parent user (i.e., user 121 illustrated in FIG. 1) may want to monitor movements of a child user (i.e., user 111 illustrated in FIG. 1). The parent user may configure the system by entering user information and location information. The location information may include location parameters. The system will determine whether geolocation of the child user satisfies the parameters specified by the parent user. If the location parameters are satisfied, the system will generate a notification to the mobile computing device of the parent user.

Figure 2B:
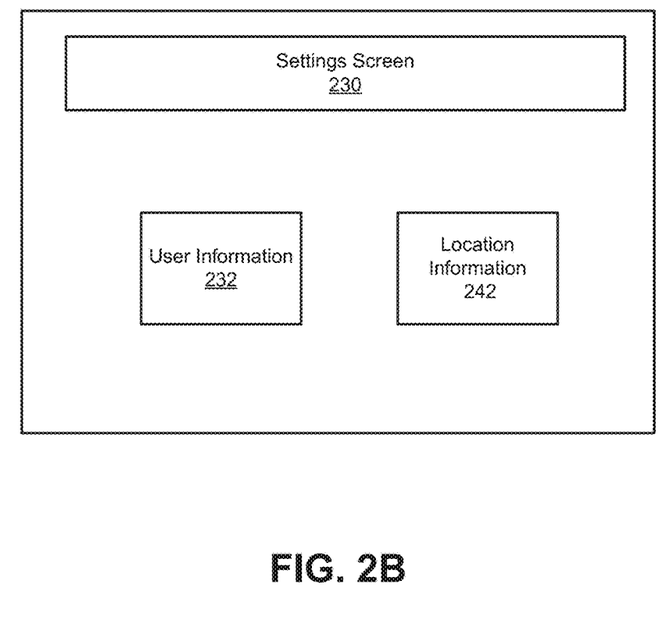
FIG. 2B illustrates an exemplary user interface for configuring parameters associated with criteria-based location notifications, in accordance with one or more implementations.

The parent user may configure the system by accessing settings screen 230 within criteria-based location notification user interface 210 on the mobile computing device. For example, and as illustrated in FIG. 2B, settings screen 230 of the criteria-based location notification user interface 210 in FIG. 2A may include access to user information configuration screen 232 and location information configuration screen 242.

Figure 2C:
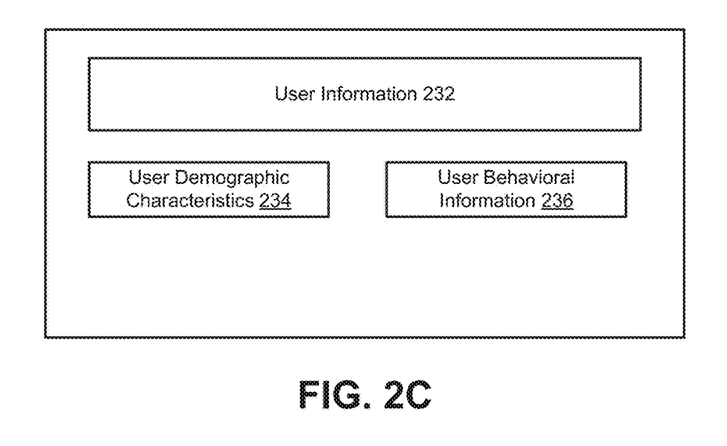
FIG. 2C illustrates an exemplary user interface for configuring user information associated with criteria-based location notifications, in accordance with one or more implementations.

Accessing user information screen 232, as illustrated in FIG. 2C, may include, for example, ability to specify user demographic characteristics 234, and user behavioral information 236 associated with a child user (e.g., user 212 illustrated in FIG. 2A). User Information 232 may include a number associated with the child user's mobile computing device, name, and other information. User demographic characteristics 234 entered by the parent user may identify an individual child user age, gender, relationship to the parent user, educational level, preferences, interests, and other such information. User behavioral information 236 associated with the child user may include the child user's special needs, medical information, behavioral problems, propensity to leave a designated area, a level of social skills, and other such information.

Figure 2D:
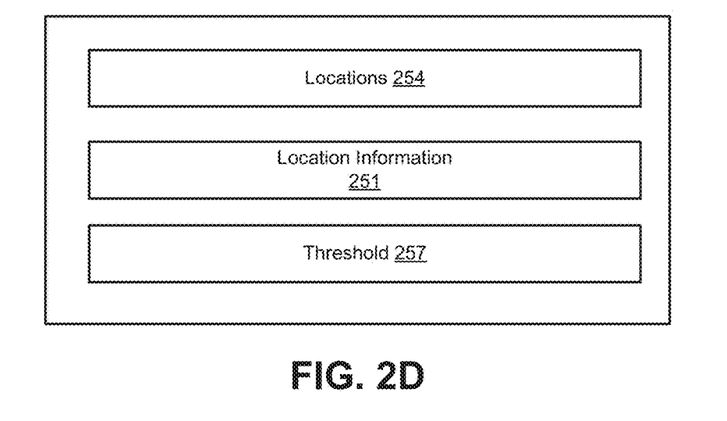
FIG. 2D illustrates an exemplary user interface for configuring location information criteria-based location notifications, in accordance with one or more implementations.

Referring back to FIG. 2B, accessing location information screen 242, as illustrated in FIG. 2D, may include, for example, ability to specify set of locations 254, location information 251, and one or more thresholds 257.

Individual locations within set of locations 254 provided by the parent user may identify locations that are prohibited or dangerous. Set of locations 254 may include positioning coordinates, addresses, or geographic areas that are known to the user to include a potential hazard. Accordingly, if the child user's geolocation corresponds to a location identified in set of locations 254, it would trigger system 100 to transmit a notification to the parent user informing him of such.

Location information 521 provided by the parent user may include a set of descriptive attributes and characteristics the parent user may associate with geolocations considered undesirable rather than specifying a set of actual geolocations.

One or more thresholds 257 provided by the parent user may include a level of a likelihood of incident occurrence determination that would trigger the system to transmit the notification to the parent user.

Referring back to FIG. 1, the geolocation information corresponding to the geolocation of user 111 transmitted from mobile computing device 103 received by system 100 may be processed by system 100. System 100 may compare the geolocation to a set of locations provided by user 121 via a criteria-based location notification user interface 210, as illustrated in FIGS. 2A and 2D. A determination where the geolocation of user 111 corresponds to the set of locations provided by user 121 may trigger a notification transmitted by system 101 to mobile computing device 123 of user 121.

For example, and as illustrated in FIG. 2A, the parent user may receive notifications 240 generated by the system in response to the geolocation information associated with one or more child users satisfying the set of locations 254 specified by the parent user, as illustrated in FIG. 2B. That is, notification 240 is generated if the child user's geolocation satisfies a particular geolocation entered by the parent user. The parent user may view notification 240 via criteria-based location notification user interface 210. Alternatively, the parent user may view individual notifications associated with the one or more child users by accessing screens associated with the one or more child users (e.g., screens 212, 214, or 216).

In some embodiments, the geolocation information may be compared to location information 251 provided by the parent user, illustrated in FIG. 2D. That is, notification 240 may be generated if the child user's geolocation satisfies the attributes specified by the parent user. The parent user may view notification 240 via criteria-based location notification user interface 210.

In some embodiments, the geolocation information may be compared to one or more thresholds 257 specified by the parent user, illustrated in FIG. 2D. That is, notification 240 may be generated if the child user's geolocation satisfies the level of likelihood of incident occurrence determination specified by the parent user. The parent user may view notification 240 via criteria-based location notification user interface 210.

In some embodiments, system 100 may obtain additional information from one or more external resources 122 in response to the geolocation of user 111. For example, system 100 may obtain a number and type of attractive nuisances at or near the geolocation (i.e., objects on the land that are likely to attract children and cause an injury), a number of registered sex offenders, and other such information.

In some embodiments, additional information obtained by system 100 may include historical incident information for incidents that have previously occurred at or near the geolocation of user 111. Historical incident information may include criminal activity rates, mortality rates caused by criminal activity, mortality rates cause by accidents, injury rates, natural disaster and other such information. For example, a criminal activity rate may include rates for violent and non-violent crimes, rates for sexual predator crimes, rates of kidnapping, and so on. Further, historical incident information may include frequency of incident occurrences, duration of incidents, outcome of incidents, type of individuals involved, time(s) of occurrence, and/or other specific information characterizing historical incidents.

System 100 may obtain additional information associated with the geolocation from a variety of sources including user 121, system administrator, or public records, social media, and other sources of additional information. For example, additional information may be obtained from one or more of a local law enforcement agency, a local Departments of Motor Vehicles, a national security agency such as the Federal Bureau of Investigation, an intelligence agency such as the Central Intelligence Agency, an international criminal policy organization, such as Interpol, a national public health agency, such as Center for Disease Control, an international public health agency, such as World Health Organization, a subject matter expert, weather maps, area maps, and other sources.

System 100 may process the additional information for the geolocation of user 111 and determine that the additional information for the geolocation indicate that the user's 111 geolocation satisfies one or more attributes characterizing an undesirable location, as provided by user 121. This determination may trigger a notification transmitted by system 101 to mobile computing device 123 of user 121. For example, additional information indicating a high number of attractive nuisance objects at or near the geolocation of user 111 may satisfy a description of an undesirable location specified by user 121.

In some implementations, system 100 may prioritize or rate the obtained additional information based on user information, as specified by user 121. For example, a number of attractive nuisances including a pond or a lake may be more relevant to a 10-year-old boy than a 16-year-old girl.

Figure 3:
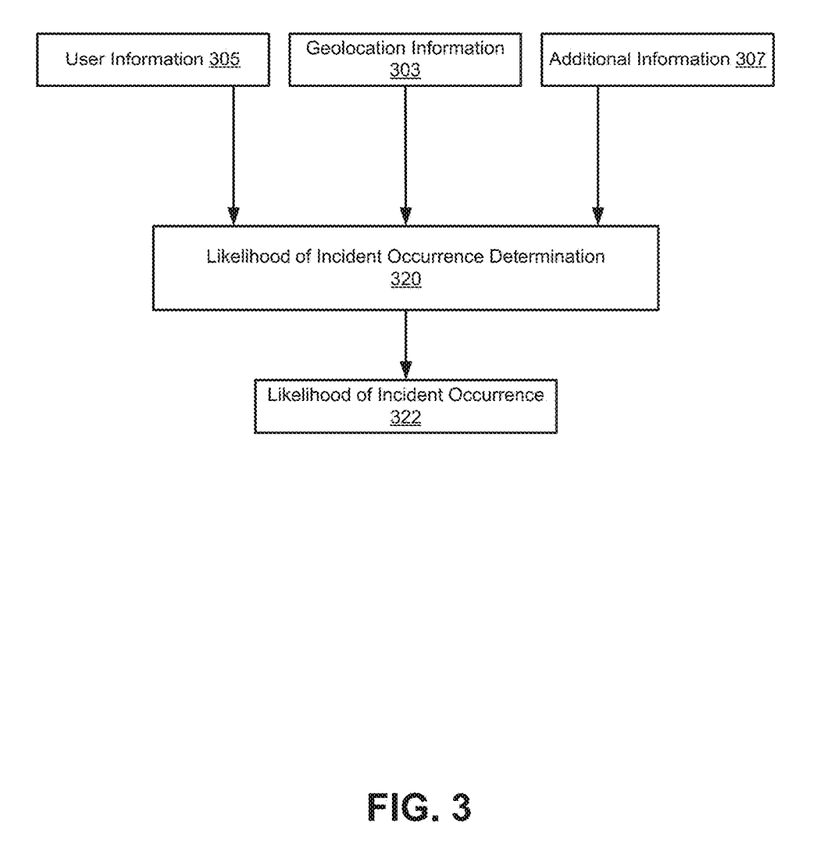
FIG. 3 illustrates an exemplary likelihood of incident occurrence determination analysis utilizing time, geographic location, user demographic information, user behavioral information, and additional information, in accordance with one or more implementations.

For example, and as illustrated in FIG. 3, system 100, illustrated in FIG. 1, may determine likelihood of incident occurrence 320 for a child user at a certain geolocation by analyzing geolocation information 303 of the child user transmitted by a mobile computing device of the child user, user information 305 for the child user specified by the parent user, and additional information 307 for the geolocation of the child user obtained by the system.

Geolocation information 303 may include time, a geolocation of the child user, whether or not the child user is traveling in a motor vehicle, and the speed and direction of such travel, and other similar information. User information 305 specified by the parent user may include child user's demographic characteristics, including child user's age, gender, relationship to the parent user, height and weight, hair color, eye color, and other such characteristics. User information 305 may include behavioral information including child user's medical information, behavioral problems, propensity to leave a designated area, a level of social skills, and other such information.

Additional information may include information related to the geolocation of the child user including satellite maps, traffic information, sex offender maps, and other similar information. Additional information 307 may include historical incident information related to incidents that have previously occurred at or near child user's geolocation. The historical incident information may include crime statistics, health and safety information, and other information obtained from various sources.

System 100 may perform likelihood of incident determination 320 by utilizing a variety of analytical techniques to analyze collected sets of geolocation data, user data, and additional data, obtained from various sources to generate incident indicator 322. For example, system 100 may utilize Bayesian-type statistical analysis to determine the incident indicator 322. Incident indicator 322 may be a quantified likelihood of an occurrence of certain negative incidents (e.g., injury, kidnapping, etc.) at a certain geolocation (e.g., a neighborhood park, a crowded mall, etc.). That is, a calculated numerical value representing incident indicator 322 reflects a likelihood of a negative event occurring at the geolocation of the child user.

In some implementations, incident indicator 322 may be expressed based on a sliding scale of percentage values (e.g., 10%, 15%, . . . n, where a percentage reflects a likelihood of incident occurrence), as a numerical value (e.g., 1, 2, . . . n, where the magnitude of quantity reflects a likelihood of incident occurrence), or as text (e.g., "very low", "low", "medium", "high", "very high"), and other similar schemes used to represent likelihood indicator 322.

In some embodiments, an aggregate likelihood indicator for a user at a large geolocation may represent a likelihood of incident occurrence within smaller geolocations comprising the large geolocation. The aggregate likelihood indicator may be determined based on a combination of incident indicators associated with individual geolocations and the information associated with the user at each location, and/or other basis.

In some implementations, geolocation information 303, user information 305, and additional information 307 may be analyzed during likelihood of incident occurrence determination 320 in conjunction with one or more predictive models. The predictive models may include one or more of neural networks, Bayesian networks (e.g., Hidden Markov models), expert systems, decision trees, collections of decision trees, support vector machines, or other systems known in the art for addressing problems with large numbers of variables. Specific information analyzed during the likelihood of incident occurrence determination may vary depending on the desired functionality of the particular predictive model.

In some implementations, specificity, relevance, confidence and/or weight may be assigned to at least one of geolocation information 303, user information 305, and additional information 307, based on the relevance and relationship between various data points. The assignment of these weight factors may be used in determination of user-specific likelihood of incident occurrence results.

For example, during the likelihood of incident occurrence determination 320 at a remote hiking destination, a higher weight may be given to an increased incidence of assaults of young females at or near the hiking destination when a child user is a young female rather than a young male.

In some embodiments, and referring back to FIG. 2D, the parent user may identify one or more thresholds 257 associated with the geolocation used by system 100 when determining likelihood of incident occurrence. That is, the parent user may specify that only determinations of likelihood of incident occurrence over a certain level likelihood of incident occurrence would trigger generating a notification to the parent user.

Referring back to FIG. 3, incident indicator 322 determined during the likelihood of incident occurrence determination 320 may be compared to a threshold specified by the user (as explained in reference to FIG. 2D). The incident indicator 322 satisfying the threshold may trigger the system to generate and transmit a notification to the parent user.

Figure 4:
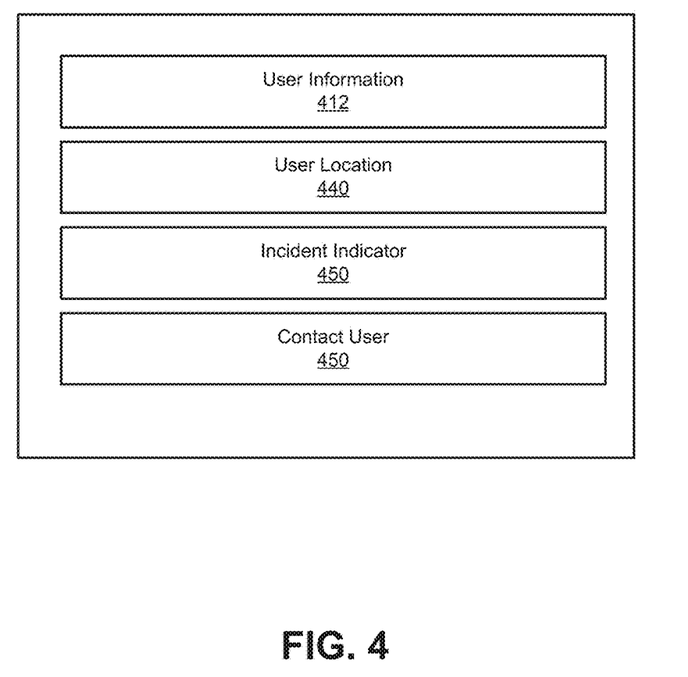
FIG. 4 is an exemplary user interface for configuring for presenting criteria-based location notifications, in accordance with one or more implementations.

For example, and as illustrated in FIG. 4, a parent user may receive notification 400 generated by the system in response to incident indicator 450 generated during a likelihood of incident occurrence determination for a child user's geolocation satisfying a threshold specified by the parent user. The parent user may access user information 412 and geolocation information 440 associated with the child user. Further, the parent user may contact the child user by accessing contact user 450 screen. Contact user 450 screen may enable the parent user to call the child user's mobile computing device, send a message using Short Messaging Standard, send an e-mail, or use other such means of contacting the child user.

Referring back to FIG. 1, user 111 (i.e., a child user) may receive a notification generated by system 100 and transmitted to user 121, in response to a determination that user's 111 location satisfies location parameters entered by user 121. Further, user 111 may receive a notification generated by system 100 and transmitted to user 121, in response to a determination that the incident indicator generated based on user's 111 location, user information entered by user 121, and additional information obtained by system 100 satisfies a threshold entered by user 121. The notification transmitted to user 111 may by system 100 may be viewed by user 111 via mobile computing device 103 associated with user 111.

Figure 5:
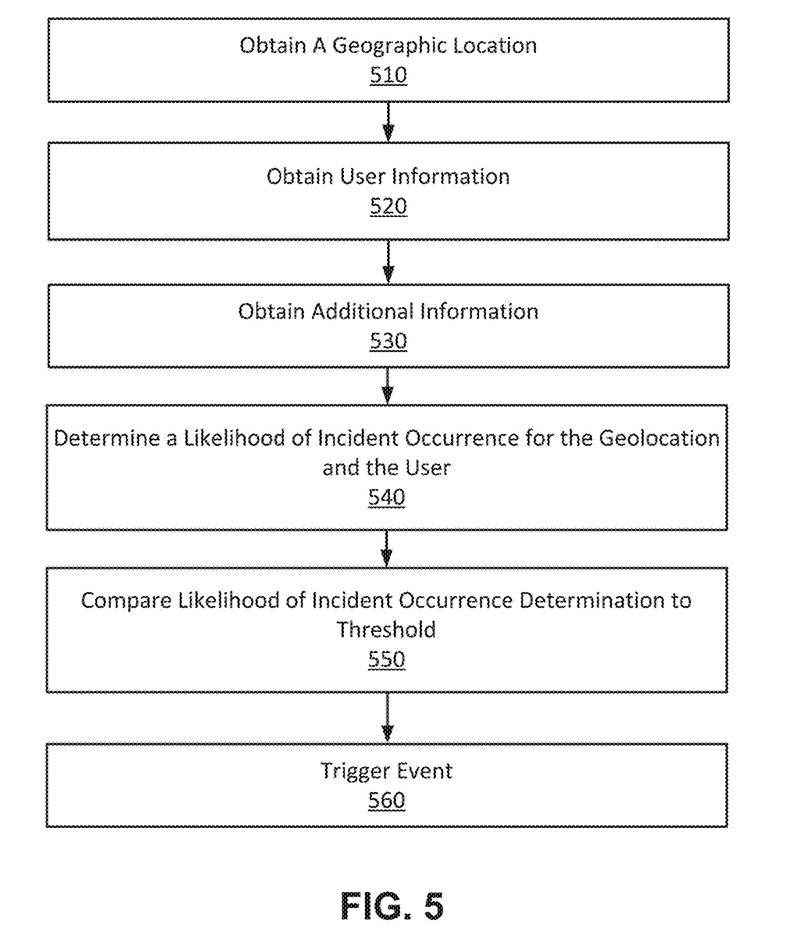
FIG. 5 is a flow chart illustrating various operations that may be performed during a likelihood of incident occurrence determination for a user at a geolocation, in accordance with one or more implementations an online purchase transaction, in accordance with embodiments disclosed herein.

FIG. 5, illustrates a flow chart describing various processes that can be performed in order to provide criteria-based location notifications in accordance with one embodiment. At operation 510, a system obtains geolocation information associated with a geolocation of a child user. The geolocation information is transmitted from the child's mobile computing device to a system. At operation 520, the system obtains user information. The user information is provided by the parent user via a criteria-based location notification user interface of the system. At operation 530, the system obtains additional information related to the child user's geolocation. As described above, the additional information may be obtained by the system from one or more external resources including a variety of sources. At operation 540, the system determines a likelihood of incident occurrence for the geolocation based on the user geolocation information, the user information, and the additional information. Next, the system generates an incident indicator which quantifies the likelihood of incident occurrence the child user at child user's geolocation. At operation 550, the system compares the incident indicator to a threshold specified by the parent user. Finally, upon the incident indicator satisfying the threshold provided by the parent user, at operation 560, a notification is transmitted to the parent user. The notification includes the incident indicator reflecting the occurrence of incident occurrence at the geolocation of the child user.

Figure 6:
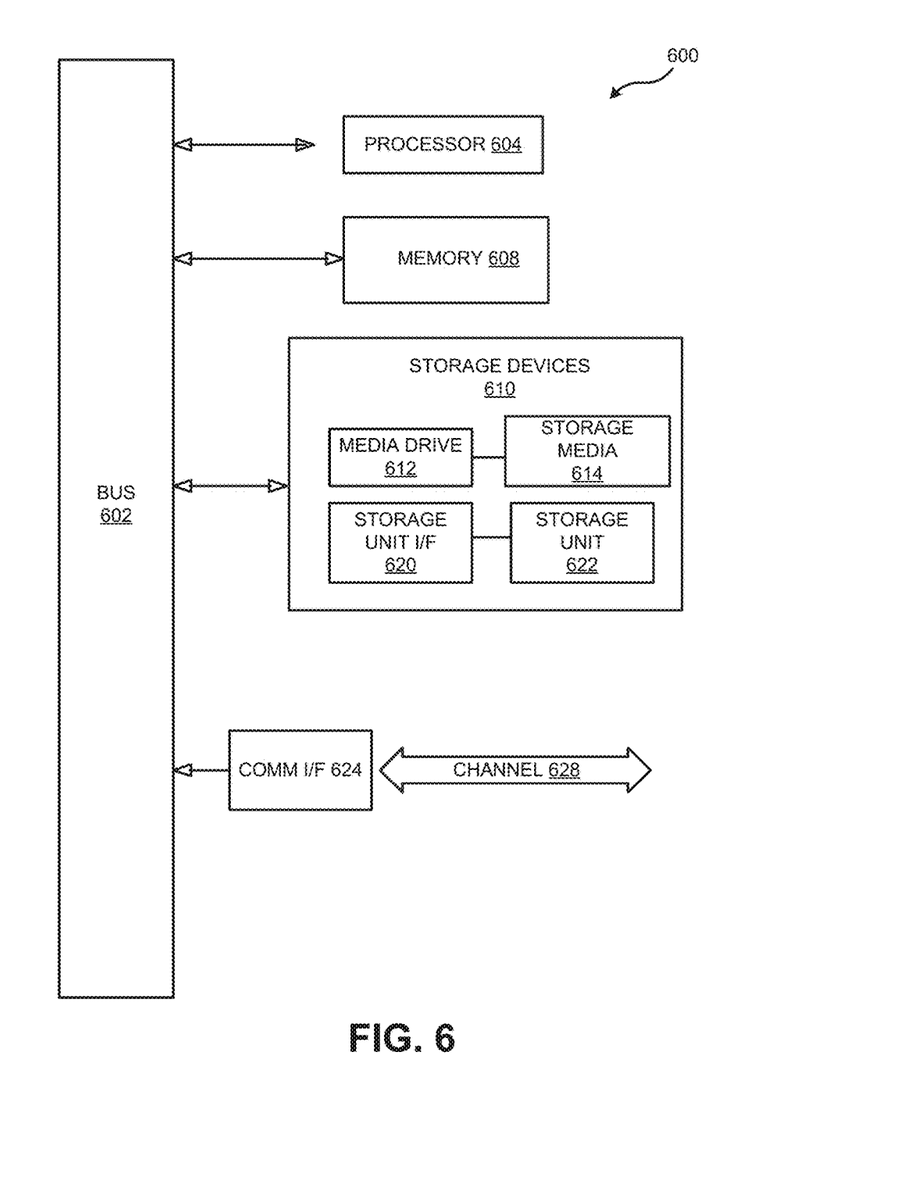
FIG. 6 illustrates an example computing component that may be used in implementing various features of embodiments of the disclosed technology.

FIG. 6 illustrates an example computing module 600, an example of which may be a processor/controller resident on a mobile device that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage devices 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 622 and a storage unit interface 620. Examples of such storage units 622 and storage unit interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit interface 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for triggering events in a client application, the method comprising:
    obtaining event information defining event requirements for triggering an event within an interactive client application hosted over a network, the event information specifying location criteria including an incident occurrence threshold;
    obtaining geolocation information, the geolocation information indicating a geolocation of a first user;
    obtaining demographic characteristics of the first user;
    obtaining incident information related to the geolocation of the first user;
    determining a likelihood of incident occurrence for the geolocation and the first user based on the demographic characteristics of the first user and the incident information related to the geolocation of the first user;
    comparing the likelihood of incident occurrence for the geolocation and the first user with the location criteria to determine whether the likelihood of incident occurrence determined for the geolocation and the first user satisfies the location criteria by being within the the incident occurrence threshold specified by the location criteria; and
    responsive to the geolocation of the first user satisfying the location criteria, triggering the event in the client application of a second user;
    wherein obtaining the event information for triggering the event triggered in the client application of the second user includes obtaining the event information that defines the location criteria via a graphical user interface configured to receive entry or selection of the event information from the second user that is different from the first user.

2. The method of claim 1, wherein responsive to the geolocation of the first satisfying the location criteria, triggering the event in the client application of the first user.

3. The method of claim 1, wherein the event triggered in the client application of the second user comprises a notification.

4. The method of claim 1, wherein determination of the likelihood of incident occurrence is calculated using Bayesian statistics.

5. The method of claim 1, further comprising obtaining behavioral information of the first user for the geolocation.

6. The method of claim 5, wherein the behavioral information of the first user for the geolocation is provided by the second user.

7. The method of claim 5, wherein the determination of the likelihood of incident occurrence for the geolocation and the first user is further configured to be based on the behavioral information.

8. The method of claim 1, wherein the additional incident information comprises historical incident information for incidents that have previously occurred at or near the geolocation.

9. The method of claim 8, wherein the historical incident information for incidents that have previously occurred at or near the geolocation includes statistical crime data.

10. The method of claim 9, wherein the determination of the likelihood of incident occurrence for the geolocation and the first user is further configured to be based on the historical incident information.

11. A system for triggering events in a client application, the system comprising:
    one or more physical processors configured by machine-readable instructions to:
        obtain event information defining event requirements for triggering an event within an interactive client application hosted over a network, the event information specifying location criteria including an incident occurrence threshold;
        obtain geolocation information, the geolocation information indicating a geolocation of a first user;
        obtain demographic characteristics of the first user;
        obtain incident information related to the geolocation of the first user;
        determine a likelihood of incident occurrence for the geolocation and the first user based on the demographic characteristics of the first user and the incident information related to the geolocation of the first user;
        compare the likelihood of incident occurrence at the geolocation of the first user with the location criteria to determine whether the likelihood of incident occurrence determined for the geolocation and the first user satisfies the location criteria by being within of the incident occurrence threshold specified by the location criteria;

responsive to the geolocation of the first user satisfying the location criteria, triggering the event in the client application of a second user;

wherein obtaining the event information for triggering the event in the client application of the second user includes obtaining the event information that defines the location criteria via a graphical user interface configured to receive entry or selection of the event information from the second user that is different from the first user.

12. The system of claim 11, wherein responsive to the geolocation of the first satisfying the location criteria, triggering the event in the client application of the first user.

13. The system of claim 11, wherein the event triggered in the client application of the second user comprises a notification.

14. The system of claim 11, wherein determination of the likelihood of incident occurrence is calculated using Bayesian statistics.

15. The system of claim 11, wherein the one or more physical processors are further configured to obtain a query time at which the first user is or will be present at the geolocation and wherein the determination of the likelihood of incident occurrence for the geolocation and the first user is further configured to be based on the query time.

16. The system of claim 11, wherein the one or more physical processors are further configured to obtain behavioral information of the first user at the geolocation.

17. The system of claim 16, wherein, the behavioral information of the first user at the geolocation is provided by the second user.

18. The system of claim 16, wherein the determination of the likelihood of incident occurrence for the geolocation and the first the user is further configured to be based on the behavioral information.

19. The system of claim 11, wherein the incident information comprises historical incident information for incidents that have previously occurred at or near the geolocation.

20. The system of claim 19, wherein the determination of the likelihood of incident occurrence for the geolocation and the user is further configured to be based on the historical incident information.

* * * * *